United States Patent [19]

Miida et al.

[11] Patent Number: 4,945,377
[45] Date of Patent: Jul. 31, 1990

[54] PHASE DIFFERENCE DETECTING APPARATUS

[75] Inventors: Takashi Miida; Nozomu Ozaki, both of Kanagawa, Japan

[73] Assignee: Fuji Photo Film Co., Ltd., Kanagawa, Japan

[21] Appl. No.: 216,360

[22] Filed: Jul. 7, 1988

[30] Foreign Application Priority Data

Jul. 8, 1987 [JP] Japan .................. 62-168895

[51] Int. Cl.⁵ .............................. G03B 13/00
[52] U.S. Cl. .................... 354/402; 354/408
[58] Field of Search ............... 354/400, 402, 406–409; 250/201, 204, 578

[56] References Cited

U.S. PATENT DOCUMENTS

| | | | |
|---|---|---|---|
| 4,297,014 | 10/1981 | Nakamura et al. | 354/402 |
| 4,316,657 | 2/1982 | Suzuki et al. | 354/402 |
| 4,422,741 | 12/1983 | Masunaga et al. | 354/403 |
| 4,443,078 | 4/1984 | Niwa et al. | 354/403 |
| 4,466,718 | 8/1984 | Lermann et al. | 354/408 |
| 4,470,676 | 9/1984 | Kinoshita et al. | 354/406 |
| 4,709,138 | 11/1987 | Suda et al. | 354/408 |

FOREIGN PATENT DOCUMENTS 1553860 10/1979 United Kingdom .

Primary Examiner—L. T. Hix
Assistant Examiner—David Gray

[57] ABSTRACT

A phase difference-detecting apparatus for detecting a relative distance between a pair of focused images obtained from a subject luminous flux passed through an objective lens to thereby judge a focusing state of the objective lens. The apparatus includes a pair of signal generating sections which receive the subject flux and provide first and second time series signals. A switching-capacitor integrator is provided including a plurality of capacitive elements and switching elements for intermittently connecting the capacitive elements to each other, and for receiving the first and second time series signals. A control device compares the sizes of the first and second time series signals with each other to thereby generate a control signal corresponding to a relation of size between the first and second time series signals. The switching elements are controlled on the basis of the control signal to cause the switching-capacitor integrator to generate an electric charge corresponding to an integrated value of an absolute value of a difference between the first and second time series signals, and to cause the switching-capacitor integrator to generate, as a correlation value, an integrated value on the basis of the first and second time series signals in predetermined numbers whenever the quantity of relative movement is changed. The switching-capacitor integrator includes a gain control including a plurality of switchable capacitances.

4 Claims, 6 Drawing Sheets

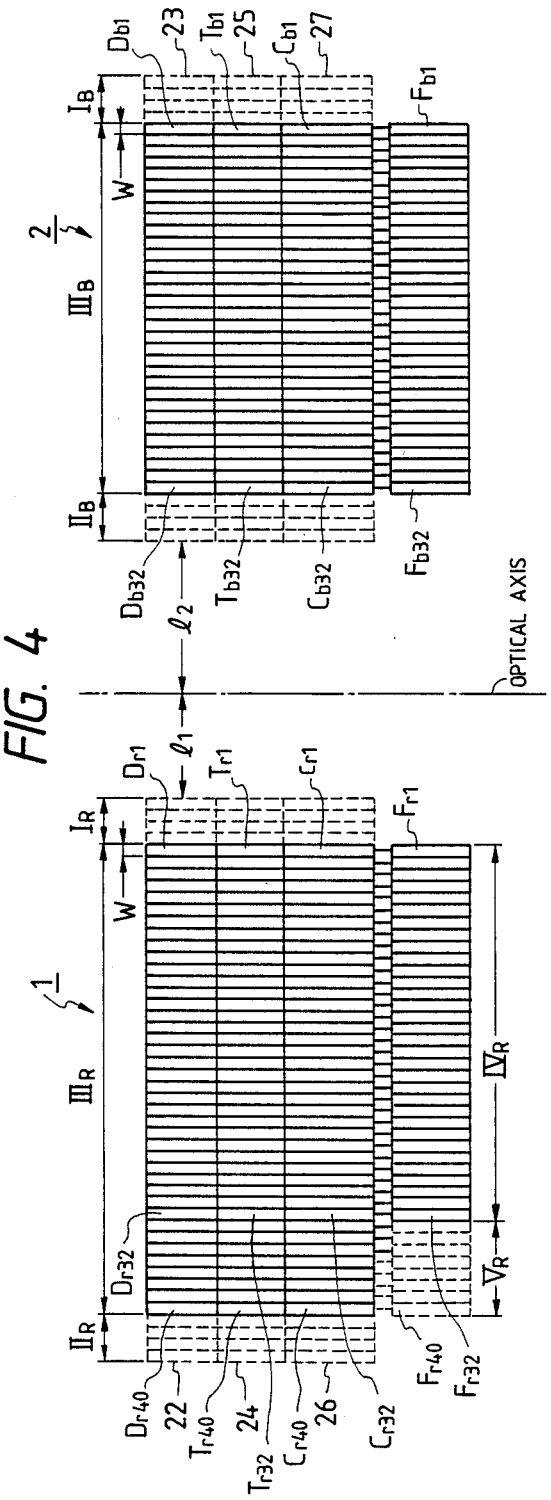
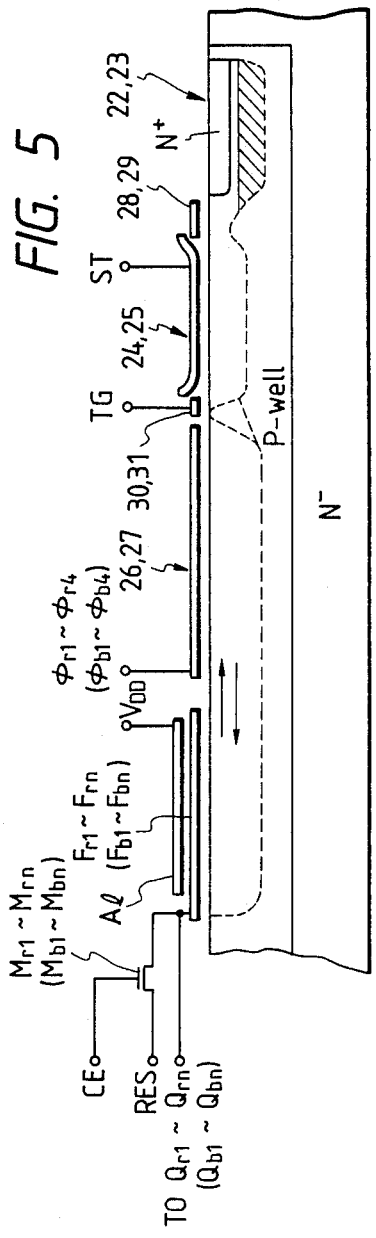

PHASE DIFFERENCE DETECTING APPARATUS

BACKGROUND OF THE INVENTION

1. Field of the Invention

The present invention relates to a phase difference detecting apparatus which is suitably applicable, for example, to an automatic focal point detecting device of a camera, and particularly relates to a phase difference detecting apparatus for performing operation processing for phase difference detection through analog signal processing.

2. Description of Related Art

A conventional phase difference detecting apparatus will be described in relation to an automatic focal point detecting device of a camera. A condenser lens, a separator lens and a phase difference detecting apparatus are positioned in order in the rear of a film equivalent plane located in the rear of an objective lens. The phase difference detecting apparatus is provided with a pair of image sensors constituted by CCDs, or the like, for photoelectrically converting a pair of subject images focused by the separator lens, and an operation circuit for operating on a phase difference between the pair of subject images on the basis of electric signals generated through the photoelectric conversion so as to judge the focus state.

That is, a signal B(k) to be operated on which is time-serially output from one of the image sensors and a signal R(k) to be operated on which is time-serially output from the other image sensor are subject to differential operation on the basis of the following equation (1) to thereby calculate values H(1), H(2) ... H(l), so that the focus state and the quantity of focal displacement are detected on the basis of a distribution pattern of the correlative values.

$$H(l) = |B(k) - R(k+l-1)| \quad (1)$$

where l is an integer not smaller than 1 which shows a quantity of relative movement between the signals B(k) and R(k).

In such a conventional phase difference detecting apparatus, however, there have been problems in that since operation is carried out through digital signal processing by using a micro-computer or the like; an expensive A/D converter and so on are required in order to perform high-speed and accurate operation; round off errors are produced due to limitation in the number of bits of the microcomputer, or the like, for carrying out the operation, so that the accuracy of the operation deteriorates; the work of design of computer programming for the operation processing becomes large; a memory capable of storing a great number of digital data is required, and so on.

SUMMARY OF THE INVENTION

It is therefore an object of the present invention to solve the foregoing problems in the prior art.

It is another object of the present invention to provide a phase difference detecting apparatus in which operation processing can be executed at a high speed and with high accuracy and which can be constituted by an IC with a simple arrangement.

In order to achieve the above object, according to the present invention, the phase difference detecting apparatus for detecting a relative distance between a pair of focused images obtained from subject luminous flux passed through an objective lens, to thereby judge a focusing state of the objective lens, comprises:

(A) a first signal generating means including (a) a first light receiving section constituted by picture elements arranged in a row so as to receive a first one of the focused images, (b) a first signal reading-out section for transferring, in a predetermined direction, signals generated in the respective picture elements of the first light receiving section and at the same time outputting the signals in parallel to each other through floating gates of a CCD, and (c) and means for converting the signals output in parallel from the first signal reading-out section into a first time series signal and outputting the first time series signal;

(B) a second signal generating means including (a) a second light receiving section constituted by picture elements arranged in a row to receive a second one of the focused images, (b) a second signal reading-out section for transferring, in a predetermined direction, signals generated in the respective picture elements of the second light receiving section and at the same time outputting the signals in parallel to each other through floating gates of a CCD, and (c) means for converting the signals output in parallel from the second signal reading-out section into a second time series signal which have a predetermined quantity of relative movement relative to the first time series signal and outputting the second time series signal;

(C) a switching-capacitor integrator including a plurality of capacitive elements and switching elements for intermittently connecting the capacitive elements to each other, and for receiving the first and second time series signals;

(D) a gain control means for controlling a gain of the switching-capacitor integrator by changing capacitance of the plurality of capacitive elements; and (E) a control means for comparing sizes of the first and second time series signals with each other to thereby generate a control signal corresponding to a relation of size between the first and second time series signals, and controlling the switching elements on the basis of the control signal to cause the switching-capacitor integrator to generate an electric charge corresponding to an integrated value of an absolute value of a difference between the first and second time series signals and to cause the switching-capacitor integrator to generate, as a correlative value, an integrated value on the basis of the first and second time series signal in predetermined numbers whenever the quantity of relative movement is changed.

In the thus arranged phase difference detecting apparatus, it is possible to improve the number of degrees of freedom in correlative operation by changing the gain of the switching-capacitor integrator.

BRIEF DESCRIPTION OF THE DRAWINGS

Other features and advantages of the present invention will be apparent from the following description taken in connection with the accompanying drawings which are given by way of illustration only, and thus are not limitative of the present invention and, wherein:

FIG. 4 is a schematic diagram illustrating the arrangement of the light receiving section, the storage section and the shift register section of the first and second signal generating means of FIG. 3;

FIG. 5 is a sectional view illustrating a main part of the first and second signal generating means for explaining the principle of the operation thereof;

DETAILED DESCRIPTION OF THE PREFERRED EMBODIMENT

An embodiment of the phase difference detecting apparatus according to the present invention will be described with reference to the drawings.

Figure 1:
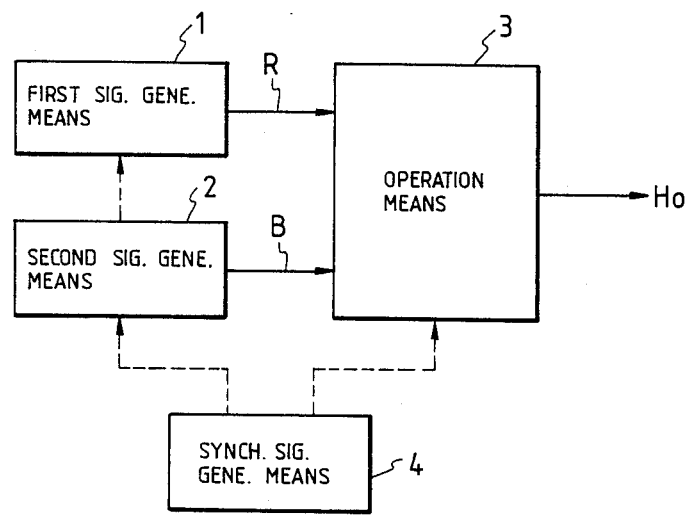
FIG. 1 is a block diagram illustrating a basic arrangement of an embodiment of the phase difference detecting apparatus according to the present invention.

FIG. 1 is a block diagram illustrating a basic arrangement which is constituted by first and second signal generating means 1 and 2 for respectively generating a pair of signals R and B to be operated on a phase difference therebetween which is to be detected, an operation means 3 for performing the same processing of differential operation as the above-mentioned equation (1), and a synchronizing signal generating means 4 for controlling the operation of the entire apparatus.

Although this phase difference detecting apparatus may be applied to various usages since it is generally capable of detecting a phase difference between a pair of signals to be operated on, the embodiment will be described as to a case in which the phase difference detecting apparatus is applied to an automatic focal point detecting device of a camera for photography, for a video system, or the like.

Figure 2:
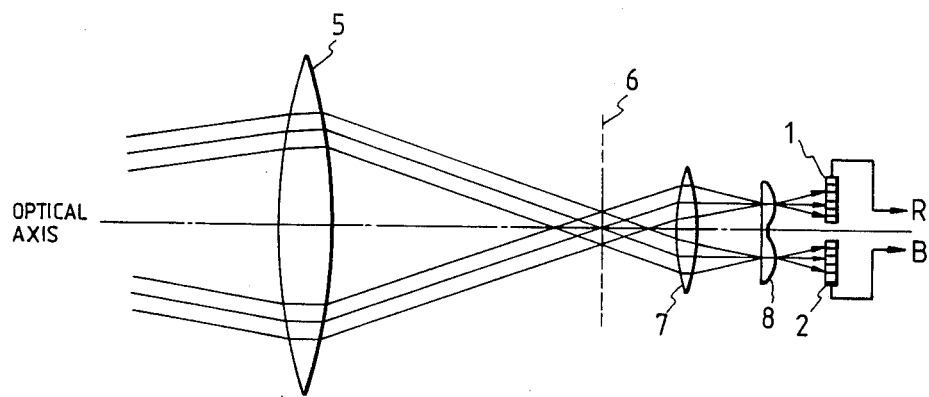
FIG. 2 is a schematic diagram illustrating the details of the basic arrangement in FIG. 1 when applied to an automatic focal-point detecting device apparatus.

The arrangement will first be described with reference to FIG. 2. Shown in FIG. 2 is a condenser lens 7 and a separator lens 8 disposed into the rear of a film equivalent plane 6, which is in turn disposed into the rear of an objective lens 5 provided in an optical system of a camera. A first and a second signal generating means 1 and 2 are provided in a focal plane of the separator lens 8.

Figure 3:
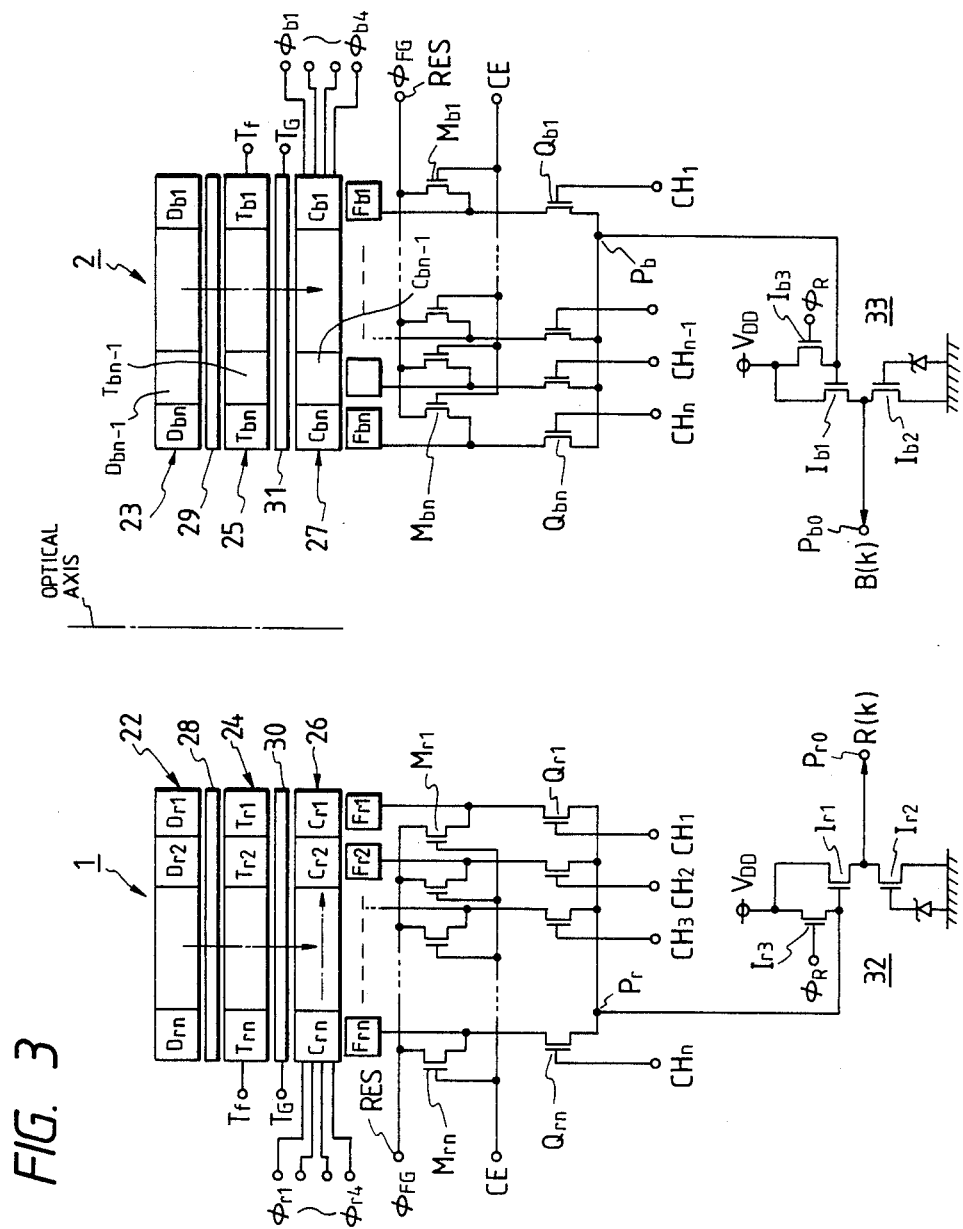
FIG. 3 is a block diagram illustrating an embodiment of the first and second signal generating means of FIG. 1.

As the first and second signal generating means 1 and 2, charge-storage devices disclosed in Japanese Patent Applications No. 61-212720, 61-212721 and 61-222211 previously filed by the inventor of this application, or the like, may be used. FIG. 3 shows the case where a reference image sensor and a reference reading-out section, and a base image sensor and a base reading-out section as disclosed in No. 61-222211 are used as the first signal generating means 1 and the second signal generating means 2, respectively.

Referring to FIG. 3, the arrangement will be described. In FIG. 3, the first signal generating means 1 includes a light receiving section 22 having a plurality of photoelectric conversions elements $D_{r1}-D_{rn}$ for receiving one of the focused images form the separator lens 8, and the second signal generating means 2 includes a light receiving section 23 having a plurality of photoelectric conversion elements $D_{b1}-D_{bn}$ for receiving the other focused image from the separator lens 8.

The light receiving section 22 and 23 are separated from each other by a predetermined distance and extended in the direction perpendicular to the optical axis. A storage section 24 and a shift register section 26 are successively provided to follow the light receiving section 22 and a storage section 25 and a shift register section 27 are successively provided to follow the light receiving section 23.

That is, the storage section 24 and the shift register section 26 are constituted by CCDs (charge transfer devices) respectively including charge transfer elements $T_{r1}-T_{rn}$ and $C_{r1}-C_{rn}$ respectively corresponding to the photoelectric conversion elements $D_{r1}-D_{rn}$, while the storage section 25 and the shift register section 27 are constituted by CCDs respectively including charge transfer elements $T_{b1}-T_{bn}$ and $C_{b1}-C_{bn}$ respectively corresponding to the photoelectric conversion elements $D_{b1}-D_{bn}$. The storage section 24 receives in parallel signal charges generated in the conversion elements $D_{r1}-D_{rn}$ and transfers in parallel the received signal charges t the shift register section 26, while storage section 25 receives in parallel signal charges generated in the conversion elements $D_{b1}-D_{bn}$ and transfers in parallel the received signal charges to the shift register section 27. The one shift register section 26 transfers the charges in the horizontal direction as indicated by an arrow. Although the operation of the shift register sections 26 and 27 will be described later, the other shift register section 27 is arranged so as not to transfer the charges in the horizontal direction.

The reference numerals 28 and 29 represent conductive layers which are formed on the surfaces of channel sections for transferring the signal charges from the light receiving section 22 and 23 to the storage sections 24 and 25 respectively. The conductive layers are formed of polysilicon layers to act as potential barriers, respectively. The reference numerals 30 and 31 represent transfer gates 30 and 31 for controlling the movement of the signal charges respectively.

Further, floating gates $F_{r1}-F_{rn}$ are formed adjacently to the charge transfer elements $C_{r1}-C_{rn}$ respectively, and are connected to a common reset terminal RES through MOS FETs $M_{r1}-M_{rn}$ each having a gate supplied with a control signal CE and to a common connection point Pr through MOS FETs $Q_{r1}-Q_{rn}$ for performing multiplex operation in response to channel change-over signals $CH_1-CH_n$ applied to their gates. On the other hand, floating gates $F_{b1}-F_{bn}$ are formed adjacently to the charge transfer elements $C_{b1}-C_{bn}$ respectively, and are connected to a common reset terminal RES through MOS FETs $M_{b1}-M_{bn}$ each having a gate supplied with a control signal CE and to a common connection point Pb through MOS FETs $Q_{b1}-Q_{bn}$ for performing multiplex operation in response to channel change-over signals $CH_1-CH_n$ applied to their gates. The connection points $P_r$ and $P_b$ are connected to output terminals $P_{ro}$ and $P_{bo}$ through impedance conversion circuits 32 and 33 respectively.

The impedance conversion circuits 32 and 33 have the same construction as each other. The circuit 32 is constituted by MOS FETs $I_{r1}$ and $I_{r2}$ with their drain-source circuits connected in series to each other between a power source $V_{DD}$ and an earth terminal, and an MOS FET $I_{r3}$ connected in parallel to the gate-source circuit of the MOS FET $I_{r1}$ for clamping the common connection point Pr to the power source $V_{DD}$ upon application of a refresh signal $\phi_R$, while the circuit 33 is constituted by MOS FETs $I_{b1}$ and $I_{b2}$ with their drain-source circuits connected in series to each other between the power source $V_{DD}$ and the earth terminal, and an MOS FET $I_{b3}$ connected in parallel to the gate-source circuit of the MOS FET $I_{b1}$ for clamping the common connection point Pb to the power source $V_{DD}$ upon application of a refresh signal $\phi_R$. The gate of each of the MOS FETs $I_{r2}$ and $I_{b2}$ is biased to a predetermined potential.

Next, referring to FIG. 4, description will be made about the positional relationship of the shift register sections 26 and 27 and the floating gates $F_{r1}$-$F_{rn}$ and $F_{b1}$-$F_{bn}$. In the first signal generating means 1, each of the set of photoelectric conversion elements constituting the light receiving section 22 and the set of charge transfer elements constituting each of the storage section 24 and the shift register section 26 is forty-eight in number. The forty-eight elements in each set are provided at equal pitch widths W and grouped into a first, a second and a third block $I_R$, $II_R$ and $III_R$, the four elements located at one side belonging to the first block $I_R$, the four elements located at the other side belonging to the second block $II_R$, the remainder 40 elements belonging to the third block $III_R$. The floating gates $F_{r1}$-$F_{r40}$ are provided correspondingly to the charge transfer elements $C_{r1}$-$C_{r40}$ belonging to the third block $III_R$ and grouped into a fourth and a fifth block $V_R$ and $V_R$ including the thirty-two floating gates $F_{r1}$-$F_{r32}$ and the remainder eight floating gates $F_{r33}$-$F_{r40}$ respectively. The respective one ends of the forty floating gates $F_{r1}$-$F_{r40}$ are connected to the reset terminal RES through the MOS FETs $M_{r1}$, $M_{r2}$, ..., and the floating gates $F_{r1}$-$F_{r32}$ of them are connected commonly to the connection point Pr through the MOS FETs $Q_{r1}$-$Q_{rn}$, as seen in FIG. 3. That is, only the parts belonging to the third and fourth blocks $III_R$ and $IV_R$ of FIG. 4 are illustrated as representative in the first signal generating means 1 in FIG. 3, while the parts belonging to the other blocks $I_R$, $II_R$ and $V_R$ which are the preparatory areas to be actuated to transfer the signal charges in the horizontal direction are omitted in FIG. 3.

In the second signal generating means 2, on the other hand, each of the set of photoelectric conversion elements constituting the light receiving section 23 and the set of charge transfer elements constituting each of the storage section 25 and the shift register section 27 is forty in number. The forty elements in each set are provided at equal pitch widths W (equal to those in the first signal generating means 1) and grouped into a first, a second and a third block $I_B$, $II_B$ and $III_B$, the four elements located at one side belonging to the first block $I_B$, the four elements located at the other side belonging to the second block $II_B$, the remainder 32 elements belonging to the third block $III_B$. The floating gates $F_{b1}$-$F_{b32}$ are provided correspondingly to the charge transfer elements $C_{b1}$-$C_{b32}$ belonging to the third block $III_B$. The respective one ends of the floating gates $F_{b1}$-$F_{b32}$ are connected to the MOS FETs $M_{b1}$-$M_{bn}$ and $Q_{b1}$-$Q_{bn}$ in FIG. 3. That is, the second signal generating means is illustrated in FIG. 3 as to the third block $III_B$ of FIG. 4.

The light receiving section 22 is formed separately from the optical axis by a distance of $l_1$, and the light receiving section 23 is formed separately from the optical axis by a distance $l_2$ ($=l_1+4W$), that is, a distance obtained by adding a four-pitches width 4W to the distance $l_1$.

The phase difference detecting apparatus according to the present embodiment is constituted by an IC as a semiconductor integrated circuit device, and the structures of the signal generating means 1 and 2 and the floating gates shown in FIGS. 3 and 4 will be described with reference to a schematic sectional view of FIG. 5.

In FIG. 5, a plurality of N+-type layers are formed in a portion of a P-type diffusion layer (P-well) formed in a surface portion of an N-type semiconductor substrate to thereby form the photoelectric conversion elements of the light receiving section 22 (23). Transfer gate electrode layers constituting the respective charge transfer elements of the barrier section 28 (29) and the storage section 24 (25), a gate electrode layer constituting the transfer gate 30 (31), and transfer gate electrode layers constituting the respective charge transfer elements of the shift register section 26 (27) are provided side by side on the semiconductor substrate through an $SiO_2$ layer (not shown). Further, an electrode layer Al to be clamped to the power source $V_{DD}$ and polysilicon layers constituting the floating gates $F_{r1}$-$F_{rn}$ ($F_{b1}$-$F_{bn}$) are laminated adjacently to the shift register section 26 (27). The electrode layer Al is formed to cover the upper surfaces of all the floating gates $F_{r1}$-$F_{rn}$ ($F_{b1}$-$F_{bn}$) formed in plurality. The MOS FETs $M_{r1}$-$M_{rn}$ ($M_{b1}$-$M_{rn}$) are connected to the one ends of the respective floating gates.

The potential of a reset signal $\phi_{FG}$ applied to the reset terminal RES is made equal to the power source $V_{DD}$ and the floating gates $F_{r1}$-$F_{rn}$ ($F_{b1}$-$F_{bn}$) are clamped to the power source $V_{DD}$ through the MOS FETs $M_{r1}$-$M_{rn}$ ($M_{b1}$-$M_{bn}$) by a "H"-level control signal CE. If the MOS FETs $M_{r1}$-$M_{rn}$ ($M_{b1}$-$M_{bn}$) are then turned off again, a deep potential well is formed in the semiconductor substrate as indicated by a dotted line in FIG. 5 so that the signal charges of the shift register section 26 (27) flow into the areas under the floating gates. The voltage changes are produced in the respective floating gates $F_{r1}$-$F_{rn}$ ($F_{b1}$-$F_{bn}$) correspondingly to the respective charge quantities of the flowed signal charges so that a pattern of image focused on the light receiving section 22 (23) can be detected as voltage signals.

On the other hand, if the MOS FETs $M_{r1}$-$M_{rn}$ ($M_{b1}$-$M_{bn}$) are turned on to thereby make the floating gates $F_{r1}$-$F_{rn}$) ($F_{b1}$-$F_{bn}$) "L"-level after the reset terminal RES has been made equal to the earth potential, the potential well in the areas under the floating gates becomes so shallow that the signal charges can be returned to the shift register section 26 (27) again. Since the movement of the signal charges is achieved nondestructively, the reading out of signal charges can be repeated.

The signals thus generated through the floating gates $F_{r1}$-$F_{rn}$ and $F_{b1}$-$F_{bn}$ are converted into time series signals R(k) and B(k) by the multiplex operation of the MOS FETs $Q_{r1}$-$Q_{rn}$ and $Q_{b1}$-$Q_{bn}$ respectively, and the time series signals R(k) and B(k) are output to the output terminals $P_{r0}$ and $P_{b0}$, respectively.

Figure 6:
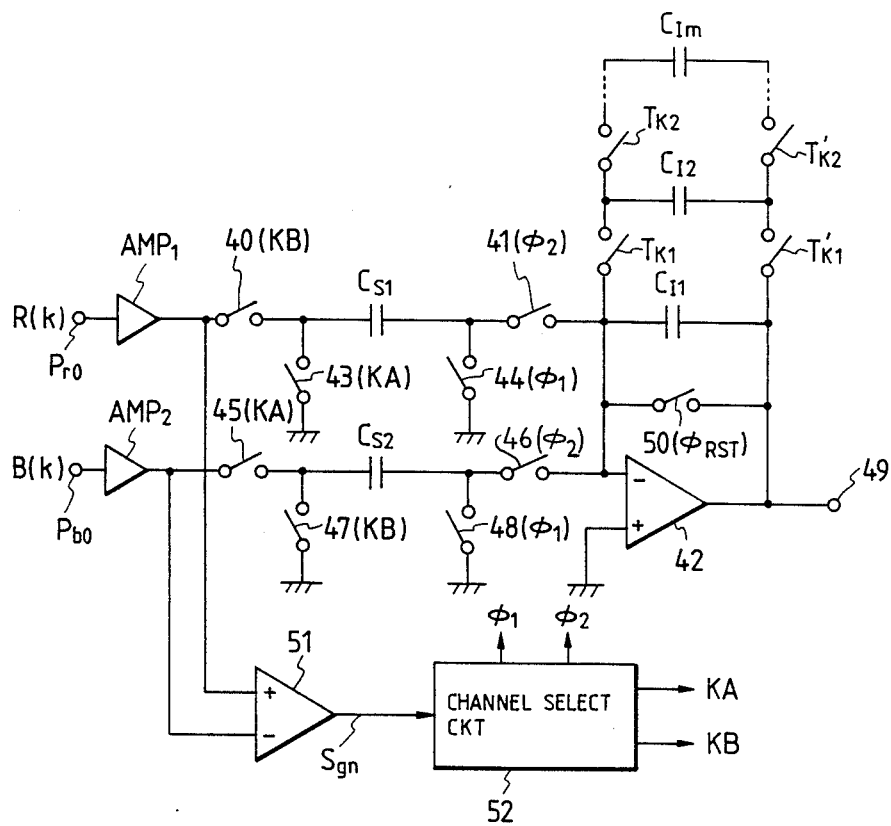
FIG. 6 is a circuit diagram illustrating the arrangement of the operation means of FIG. 1.

Next, referring to FIG. 6, the arrangement of the operation means 3 shown in FIG. 1 will be described hereunder. The operation means 3 is constituted by a switching-capacitor integrator. A signal line extended from the output terminal $P_{r0}$ of the first signal generating means 1 (with reference to FIG. 3) is connected to an inversion input terminal of a differential integrator 42 through a series connection of an amplifier amp-1, a switching element 40, a capacitive element $C_{s1}$, and a switching element 41, the opposite ends of the capacitive element $C_{s1}$ being connected to an earth terminal through switching elements 43 and 44 respectively. On the other hand, a signal line extended from the output terminal $P_{b0}$ of the second signal generating means 2 (with reference to FIG. 3) is connected to the inversion input terminal of the differential integrator 42 through a series connection of an amplifier amp-2, a switching element 45, a capacitive element $C_{s2}$ and a switching element 46, the opposite ends of the capacitive element $C_{s2}$ being connected to an earth terminal through switching elements 47 and 48 respectively. A switching element 50 and capacitive elements $C_I$ connected in parallel to each other are connected between the inversion input terminal and an output terminal 49 of the differential integrator 42.

Further, inversion and non-inversion input terminals of an analog comparator 51 are respectively connected to the signal lines extended from the output terminals $P_{r0}$ and $P_{b0}$, and an output terminal of the analog comparator 51 is connected to an input terminal of a channel selection circuit 52 which generates selection signals $\phi_1$, $\phi_2$, KA and KB for controlling "ON" and "OFF" of the switching elements 40, 41, 43, 44, 45, 46, 47 and 48.

The analog comparator 51 outputs a polarity signal $S_{gn}$ which has an "H"-level when the levels of the signals to be operated on are in the relationship of $R(k) \geq B(k)$ and has an "L"-level when $R(k) < B(k)$, so that the voltage levels of the selection signals $\phi_1$, $\phi_2$, KA and KB are determined on the basis of the level of the polarity signal $S_{gn}$.

A series connection of a plurality of switching elements $T_{k1}$, $T_{k2}$, ... $T_{km}$ and another series connection of a plurality of switching elements $T'_{k1}$, $T'_{k2}$, ... $T'_{km}$ are connected to the inversion input terminal and the output terminal of the differential integrator 42 respectively, and a plurality of capacitive elements $C_{I2}$, $C_{I3}$, ... $C_{Im+1}$ are connected in parallel to each other between respective pairs of corresponding junction points of the one and the other series connections. That is, the capacitive element $C_{I2}$ is connected between the junction point between the switching elements $T_{k1}$ and $T_{k2}$ and the junction point between the switching elements $T'_{k1}$ and $T'_{k2}$; the capacitive element $C_{I3}$ is connected between the junction point between the switching elements $T_{k2}$ and $T_{k3}$ and the junction point between the switching elements $T'_{k2}$ and $T'_{k3}$, ... ; and the capacitive element $C_{Im+1}$ is connected between the respective free terminals of the switching elements $T_{km}$ and $T'_{km}$.

Next, the operation of the thus arranged operation means 3 will be described with reference to the timing chart of FIG. 7.

Description is first made about the case where all the switching elements $T_{k1}$-$T_{km}$ and $T'_{k1}$ and $T'_{km}$ are in the "OFF" state.

Figure 7:
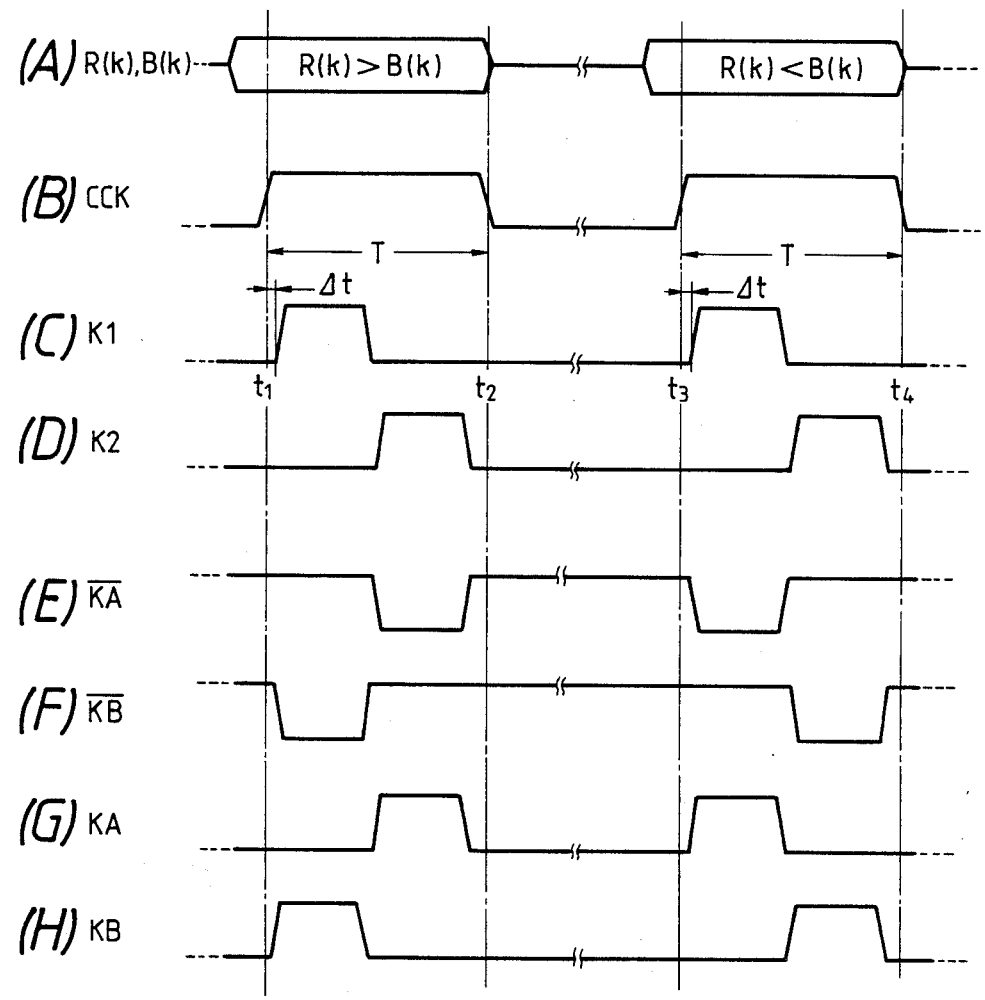
FIGS. 7A-H are timing charts for explaining the operation of the operation means of FIG. 6.

First, after the switching element 50 has been turned "ON" by a reset signal $\phi_{RST}$ applied from a not-shown reset means to thereby discharge unnecessary charges in the capacitive element $C_I$, the switching element 50 is turned "OFF" so that the operation shown in FIG. 7 is started.

The signals R(k) and B(k) to be operated on are output, respectively, from the first and second signal generating means 1 and 2 with a predetermined period as shown in the digram (A) of FIG. 7.

When the signals to be operated on are in the relationship of $R(k) \geq B(k)$, for example, in a period from a point of time $t_1$ to a point of time $t_2$, the polarity signal $S_{gn}$ becomes "H" so that the selection signals $\phi_1$, $\phi_2$, KA and KB of rectangular waves as shown in the respective digrams (B), (C), (D) and (E) of FIG. 7 are generated.

Then, the selection signals $\phi_1$ and $\phi_2$ are generated in a timing so that both of the signals KA and KB do not become "H" simultaneously. If the signals to be operated on are in the relationship of $R(k) < B(k)$, for example, in a period from a point of time $t_3$ to a point of time $t_4$, on the other hand, the polarity signal $S_{gn}$ becomes "L" so that the selection signals KA and KB whose phases are opposite to those in the period from the point of time $t_1$ to the point of time $t_2$. The selection signals $\phi_1$ and $\phi_2$ are generated in a constant timing independently of the level of the polarity signal $S_{gn}$.

The switching elements 44, 48, 40 and 47 are made to be "ON" by those selection signals $\phi_1$, $\phi_2$, KA and KB in a fore-half period $T_{F1}$ of the period $t_1$-$t_2$ so that the capacitive element $C_{S1}$ is charged with the signal R(k) to be operated while the unnecessary charges of the capacitive element $C_{S2}$ are discharged. Next, in a rear-half period $T_{R1}$ of the period $t_1$-$t_2$, the switching elements 43 and 41 are made to be "ON" so that the charges of the capacitive elements $C_{S1}$ and $C_{S2}$ are combined, and simultaneously the switching elements 45 and 46 are turned "ON" and the switching elements 47 and 48 are turned "OFF" so that the signal B(k) to be operated is supplied to the differential integrator 42 through the capacitive element $C_{S2}$. Consequently, a charge q(k) as shown in the following equation (2) is stored in the capacitive element $C_I$.

$$q(k) = (C_I/C_{S1}) \cdot R(k) - (C_I/C_{S2}) \cdot B(K) \qquad (2)$$

On the other hand, when the signals to be operated on are in the relationship $R(k) < B(k)$, for example, in the period from $t_3$ to $t_4$, the switching elements 44, 48, 43 and 45 are "ON" in a fore-half period $T_{F2}$ of the period $t_3$-$t_4$ so that the capacitive element $C_{S2}$ is charged with the signal B(k) to be operated on and the necessary charges of the capacitive element $C_{S1}$ are discharged. Next, in a rear-half period $T_{R2}$ of the period $t_3$-$t_4$, the switching elements 47 and 46 are "ON" so that the charges of the capacitive elements $C_{S2}$ and $C_I$ are combined, and simultaneously the switching elements 40 and 41 are turned "ON" and the switching elements 43 and 44 are turned "OFF" so that the signal R(k) is supplied to the differential integrator 42 through the capacitive element $C_{S1}$. Consequently, a charge q(k) as shown in the following equation (3) is stored in the capacitive element $C_I$.

$$q(k) = (C_I/C_{S2}) \cdot B(k) - (C_I/C_{S1}) \cdot R(k) \qquad (3)$$

As seen from the above equations (2) and (3), the charges corresponding to the value obtained by subtracting one of the signals to be operated on having a small level from the other having a large level is stored in the capacitive element $C_I$ in the operation means, and therefore if the processing is repeatedly carried out on the time series signals R(1) ... R(n) and B(1) ... B(n) to be operated, an absolute value H of the difference between these signals is obtained as a voltage signal at the output terminal 49 as shown in the following equation (4).

$$H = \sum_{k=1}^{n} |(C_I/C_{S2}) \cdot B(k) - (C_I/C_{S1}) \cdot R(k)| \qquad (4)$$

After completion of the operation of the above equation (4) in the first and second signal generating means 1 and 2 of FIG. 3, the signal charges held by the shift register section 26 of the first signal generating means 1 are transferred by a part corresponding to one pitch to the signal charges of the other shift register section 27, and the signal charges of the respective shift register sections 26 and 27 which are displaced in phase relative to each other are time serially read out again so as to be subject to the operation processing of the above equation (4). Then, the signal charges of the shift register sections 26 and 27 are displaced in phase relative to each other and subject to the processing repeatedly. The displacement in phase corresponds to the above-mentioned quantity of relative movement l, and the correlative value when the quantity of movement l is sequentially changed can be obtained as the following equation (5) and can be detected as a voltage signal from the output terminal 49.

$$H(l) = \sum_{k=1}^{n} |(C_I/C_{S2}) \cdot B(k) - (C_I/C_{S1}) \cdot R(k + l - 1)| \quad (5)$$

That is, this equation (5) corresponds to the above-mentioned equation (1), and the correlative values H(1), H(2) . . . , H(l) can be obtained through analog signal processing.

Figure 8:
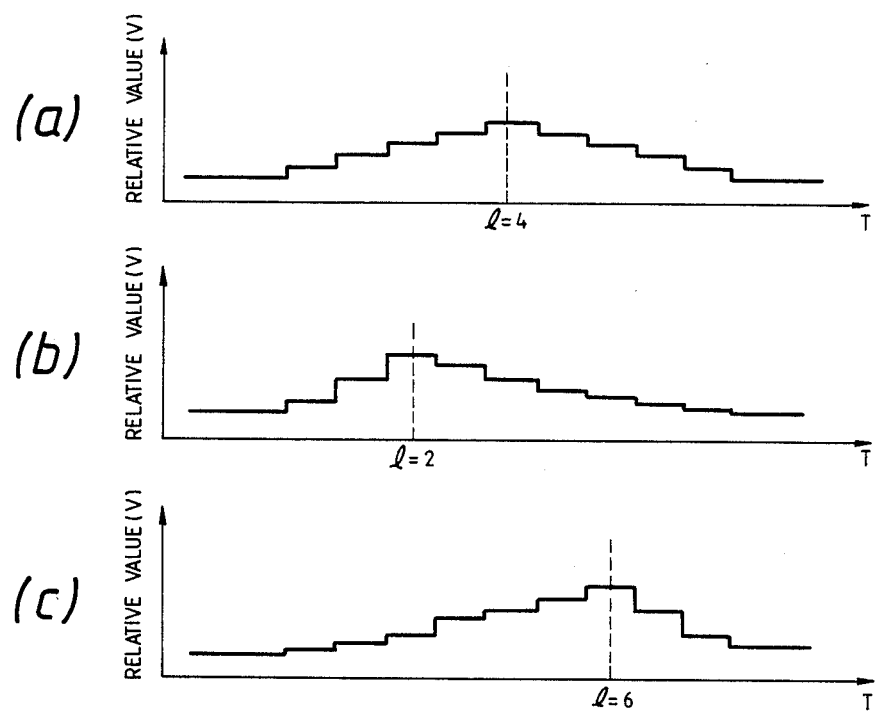
FIGS. 8a-8c are explanatory diagrams illustrating the principle of judgment of the state of focus on the basis of a pattern of distribution of the correlative values obtained by the embodiment.

Then, the phase difference can be detected on the basis of a pattern of distribution of these correlative values. For example, the diagrams (a)-(c) of FIG. 8 show the patterns of the correlative values in the case where the apparatus is applied to an automatic focal-point detecting device in a camera. Assuming that the state of focus is obtained in the case of the diagram (a) of FIG. 8 in which the maximum correlative value is obtained in the condition of the quantity of relative movement l=4, it is possible to judge the state to be "ahead focus" when the maximum correlative value is obtained at the quantity of relative movement smaller than the above case, for example, l=2, as shown in the diagram (b) of FIG. 8, and to be "behind focus" when the maximum correlative value is obtained at the quantity of relative movement larger than the above case, for example l=6, as shown in the diagram (c) of FIG. 8.

Next, if the correlative operation is executed similarly to the above case under the condition that the switching elements $T_{k1}$ and $T'_{k1}$ are in the "ON" state, the capacitance between the inversion terminal and the output terminal of the differential integrator 42 is $C_{I1}+C_{I2}$, so that the gain G is expressed by the following equation:

$$G = C_s/(C_{I1}+C_{I2})$$

where it is assumed that $C_s = C_{s1} = C_{s2}$. Similarly to this, if the "ON"/"OFF" change-over of the switching elements $T_{k1}-T_{km}$ and $T'_{k1}-T'_{km}$ is suitably operated to thereby connect one or more capacitive elements in parallel to the capacitive element $C_{I1}$, the gain G can be changed in accordance with the following equation (6).

$$G = \frac{C_s}{\sum_{i=1}^{m} C_{Ii}} \quad (6)$$

Thus, it is possible to cope with the case where operation of correlative values is executed respective to the signals R(k) and B(k) to be operated on/each having large data, the case where operation of correlative values is executed respective to the signals R(k) and B(k) to be operated on each having a large amplitude, or the like, and it is therefore possible to improve the latitude of the correlative values.

In the phase difference detecting apparatus in which a relative distance between a pair of focused images obtained from subject luminous flux passed through a taking lens is detected to thereby judge the state of focus of the taking lens, according to the present invention, as described above, signals generated by photoelectric conversion of the respective focused images are stored in CCDs and are non-destructively output through floating gates provided on the CCDs, so that it is not necessary to separately provide a large-scale memory to make it possible to reduce the size of the apparatus. Moreover, since the method of charge-couple by means of a switching-capacitor integrator using capacitive elements is used to calculate the correlative values of the output signals through analog operation, it is possible to perform the operation at a high speed and accurately. Further, since the circuit arrangement is simple and the relative accuracy of the capacitive elements can be improved if the semiconductor integrated circuit technique is used, the phase difference detecting apparatus according to the present invention can be suitably produced in the form of a semiconductor integrated circuit. Further, since the gain of the switching-capacitor integrator is made variable, it is possible to carry out correlative operation with respective to signals to be operated of a large amount of data, or with respective to signals to be operated of a wide dynamic range, so that the latitude of the correlative values can be improved.

What is claimed is:

1. A phase difference detecting apparatus for detecting a relative distance between a pair of focused images obtained from subject luminous flux passed through an objective lens to thereby judge a focusing state of said objective lens, comprising:
   (a) a first signal generating means including,
      1. a first light receiving section constituted by picture elements arranged in a row so as to receive a first one of said focused images,
      2. a first signal reading-out section for transferring, in a predetermined direction, signals generated in said respective picture elements of said first light receiving section and at the same time outputting said signals in parallel, with respect to each other, through floating gates of a first CCD, and
      3. means for converting said signals output in parallel from said floating gates of said first CCD into a first time series signal and outputting said first time series signal;
   (b) a second signal generating means including,
      1. a second light receiving section constituted by picture elements arranged in a row to receive a second one of said focused images,
      2. a second signal reading-out section for transferring, in a predetermined direction, signals generated in said respective picture elements of said second light receiving section and at the same time outputting said signals in parallel, with respect to each other, through floating gates of a second CCD, and
      3. means for converting said signals output in parallel from said floating gates of said second CCD into a second time series signal which has a predetermined quantity of relative movement relative to said first time series signal and outputting said second time series signal;

(c) a switching-capacitor integrator means including a plurality of capacitive elements and switching elements for intermittently connecting said capacitive elements to each other, and for receiving said first and second time series signals;

(d) gain control means for controlling a gain of said switching-capacitor integrator means by changing capacitance of said plurality of capacitive elements; and (e) control means for comparing sizes of said first and second time series signals with each other to thereby generate a control signal corresponding to a relation of size between said first and second time series signals, and controlling said switching elements on the basis of said control signal to cause said switching-capacitor integrator means to generate an electric charge corresponding to an integrated value of an absolute value of a difference between said first and second time series signals and to cause said switching-capacitor integrator means to generate, as a correlative value, an integrated value on the basis of said first and second time series signals in predetermined numbers whenever said quantity of relative movement is changed in order to provide a signal indicative of a phase difference between said first and second time series signals.

2. A phase difference detecting apparatus for detecting a relative distance between a pair of first and second focused images obtained from luminous flux passed through an objective lens to thereby judge a focusing state of said objective lens, comprising:

first signal generating means for generating a first time series signal responsive to received luminous flux of said first focused image;

second signal generating means for generating a second time series signal, responsive to received luminous flux of said second focused image, which has a predetermined quantity of relative movement relative to said first time series signal; and operation means, for developing a correlative output indicative of a phase difference between said first and second time series signals, comprising switching-capacitor integrator means including a plurality of capacitors selectively intermittently connected to each other by a plurality of switching means, gain control means for controlling a gain of said switching-capacitor integrator means by changing capacitance of said plurality of capacitors, and control means for comparing said first and second time series signals in order to determine the signal of greater value in order to generate a control signal indicative thereof, and controlling said plurality of switching means on the basis of said control signal in order to provide a correlative output corresponding to an integrated value of an absolute value of a difference between said first and second time series signals whenever said quantity of relative movement is changed.

3. The phase difference detecting apparatus of claim 2 wherein said first signal generating means comprises:

first light receiving means, constituted by a first plurality of picture elements, for receiving said luminous flux of said first focused image;

first signal reading-out means for transferring, in a predetermined direction, signals generated in said first plurality of picture elements and for outputting said signals in parallel through a first plurality of floating gates; and first conversion means, for receiving said signals in parallel from said first plurality of floating gates and for outputting said first time series signal.

4. The phase difference detecting apparatus of claim 2 wherein said second signal generating means comprises:

second light receiving means, constituted by a second plurality of picture elements, for receiving said luminous flux of said second focused image;

second signal reading out means for transferring, in a predetermined direction, signals generated in said second plurality of picture elements and for outputting said signals in parallel through a second plurality of floating gates; and second conversion means, for receiving said signals in parallel from said second plurality of floating gates and for outputting said second time series signal.

* * * * *